United States Patent
Rost

Patent Number: 5,458,396
Date of Patent: Oct. 17, 1995

[54] ROLL BAR FOR CONVERTIBLE MOTOR VEHICLES

[75] Inventor: Romulus Rost, Ingolstadt, Germany

[73] Assignee: Audi AG, Ingolstadt, Germany

[21] Appl. No.: 690,913

[22] PCT Filed: Jan. 13, 1990

[86] PCT No.: PCT/EP90/00071

§ 371 Date: Apr. 13, 1993

§ 102(e) Date: Apr. 13, 1993

[87] PCT Pub. No.: WO90/08675

PCT Pub. Date: Aug. 9, 1990

[30] Foreign Application Priority Data

Feb. 6, 1989 [DE] Germany ............ 39 03 459.3

[51] Int. Cl.⁶ .................................................. B60N 2/42
[52] U.S. Cl. ........................... 297/216.12; 297/216.13
[58] Field of Search .................. 297/216.1, 216.12, 297/216.13, 396, 404, 410; 280/753, 756

[56] References Cited

U.S. PATENT DOCUMENTS

| | | | |
|---|---|---|---|
| 3,397,911 | 8/1968 | Brosius, Sr. | 297/410 X |
| 3,420,572 | 1/1969 | Bisland | 297/410 X |
| 3,655,241 | 4/1972 | Herzer et al. | 297/396 X |
| 3,804,435 | 4/1974 | See et al. | 280/753 X |
| 4,199,191 | 4/1980 | Schneider | 297/396 X |
| 4,222,608 | 9/1980 | Maeda | 297/410 |
| 4,350,389 | 9/1982 | Pärsson et al. | 297/396 X |
| 4,668,014 | 5/1987 | Boisset | 297/410 X |

FOREIGN PATENT DOCUMENTS 2916506 11/1988 Germany.
3732562 12/1988 Germany.

Primary Examiner—Kenneth J. Dorner
Assistant Examiner—Milton Nelson, Jr.
Attorney, Agent, or Firm—Jacques M. Dulin; Frederick J. Zustak

[57] ABSTRACT

A convertible motor vehicle with at least one seat having an extendable roll bar incorporated into an upper portion thereof. In one embodiment the roll bar forms part of the headrest of the seat in a retracted rest position and is automatically extended upward from the headrest into a locked, extended operating position. The extended roll bar cooperates with the reinforced framework of the backrest of the seat which is mounted to the vehicle chassis in the conventional manner to provide a sufficient structural member to support a vertically downward impact load on the extended roll bar that occurs when the vehicle rolls over. Known motion sensors are used to trigger the roll bar and cause a release from its rest position to its operating position. In an alternate embodiment of a seat without a headrest, the roll bar forms an upper portion of the backrest of the seat while in its rest position and extends upward into its operating position in the same manner as the headrest embodiment.

17 Claims, 2 Drawing Sheets

5,458,396

ROLL BAR FOR CONVERTIBLE MOTOR VEHICLES

FIELD

The invention relates in general to an improved roll bar for use in convertible motor vehicles. More particularly, the invention relates to a seat having an extendable roll bar which forms part of the headrest of the seat during a rest position and can be moved automatically by an independent triggering device to an extended, work position. The triggering device is able to detect a dangerously unstable condition of the convertible motor vehicle, such as a violent roll or slow tipping of the vehicle.

BACKGROUND

Convertible motor vehicles require the use of roll bars to protect the occupants of the car should the car roll over. Traditional roll bars used in convertibles were typically unsightly and obtrusive tubular frameworks that were attached to the chassis of the vehicle in a manner which used valuable interior space of the passenger compartment and otherwise detracted from the aesthetic qualities associated with the "open air" aspect of the convertible. Therefore, it became desirable to have pop up-type roll bar members which remain hidden and out of the way during a rest position and pivot to the desired overhead work position when required.

A convertible motor vehicle which has a roll bar which can be moved independently from a control device from its rest position into its operating position is known for example, from German patent specification (DE-PS 37 32 562). The roll bar of this patent document has a rest position whereby the roll bar lies flat in the region of the hat shelf behind the backseat. In operation, the roll bar pivots about an axis from this rest position into its operating position. The convertible includes known means for detecting a dangerous body roll condition in order to trigger the pivotal release of the roll bar. A dangerous situation arises with this type of device when either the head or arm of a rear seated passenger is in the way of the pivot path of the roll bar at the time of its release from its rest position. Ironically, fatal injury to the rear seated passenger may occur during the operation of the very same safety device that is intended to save the passengers' life.

Accordingly, there is a great need in the art to provide a roll bar for use in convertible motor vehicles wherein the hazard of the above described injury to rear seated passengers will be avoided. In addition, there is a need in the art to provide a roll bar for use in combination with convertible-type motor vehicles, wherein the roll bar is mountable in a space-saving manner to the vehicle chassis without the need for separate mounting points so that valuable interior compartment space is not used when the roll bar is in its rest position.

THE INVENTION

OBJECTS

It is among the objects of the invention to provide a convertible seat having a retractable roll bar incorporated into the headrest thereof whereby the roll bar is moved to an extended working position upon the independent control of a device associated with the convertible motor vehicle;

It is another object of the invention to provide a spring-loaded roll bar which, when released from its rest position to its working position, does not create a hazard of striking an arm or head of any of the occupants of the vehicle;

It is another object of the invention to provide a retractable roll bar for use in convertible motor vehicles which is mounted in a space saving manner to the headrest portion of a reinforced seat so that separate mounting points for the roll bar are not required;

It is another object of the invention to provide a headrest retractable roll bar which is storable in the headrest portion of the seat and does not obstruct visibility while in its rest position;

Still other objects will be evident from the Summary, Drawings and Detailed Specification which follows.

DRAWINGS

SUMMARY

According to the invention, the objects are achieved by providing a conventionally available reinforced passenger seat with a retractable roll bar that forms part of the headrest or backrest of the passenger seat in its rest position and extends up and over the passenger's head in a work or operating position. The roll bar comprises a generally inverted U shape member having a pair of legs which cooperate with the reinforced backrest of the seat and the legs are lockable in the fully extended work position.

In the preferred embodiment, the roll bar is released from its retracted rest position and is automatically moved to its extended work position in accordance with a signal generated from a known control triggering device which senses a dangerous roll or slow tipping of the vehicle. While in its rest position, the roll bar is received within a corresponding recess of the sides and top of the headrest in a headrest embodiment, or in the top of the backrest in a backrest embodiment. Thus retracted, it does not interfere with driver or passenger visibility or detract from the aesthetic qualities of the open air feature of the convertible motor vehicle.

The roll bar is constructed of conventional materials and is easily implemented in existing automotive assembly lines since little modification is needed to incorporate the roll bar design in existing reinforced seats used in convertible or sedan-type automobiles. The roll bar may also be incorporated into the forward passenger seats as well as the rear passenger seats and all the roll bars may be triggered by the same sensor device.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Figure 1:
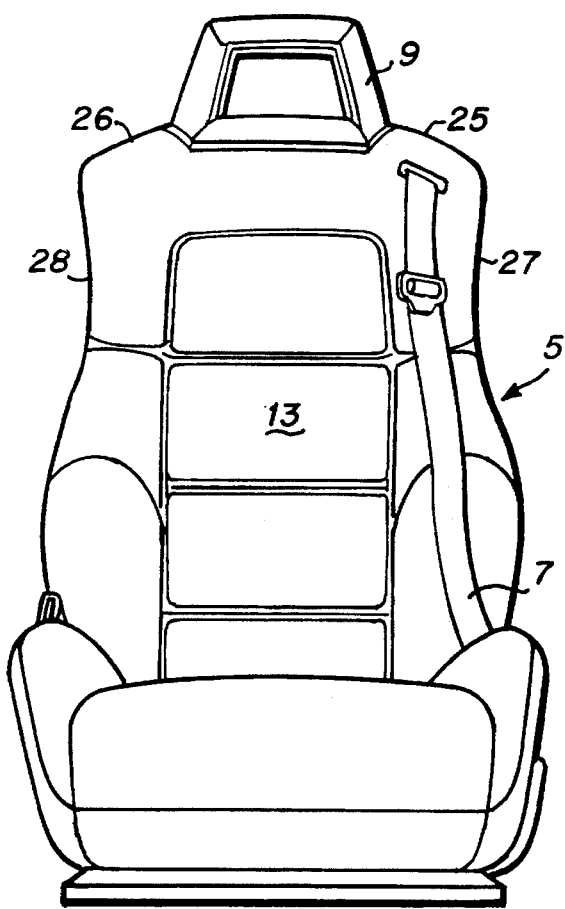
FIG. 1 is front elevation view of a vehicle seat showing a retractable roll bar in the headrest portion thereof in its retracted position.

The invention will be explained below with reference to FIGS. 1–4. FIG. 1 shows a seat 5 for a convertible motor vehicle having a safety belt 7 integrated into the side portion thereof and a headrest 9 positioned at the top of the seat 7. In the preferred embodiment, the backrest 13 is reinforced to withstand a vertical load subjected to the headrest. Such a reinforced seat having an integrated safety belt is known for example, from German patent specification (DE-PS 29 16 506). The backrest of such seats are particularly suitable for use in combination with the proposed roll bar since the backrest is already provided with the reinforcement necessary to sustain great downwardly-directed vertical loads without buckling of the backrest. The backrest would be subjected to such a load in the case when the car has overturned. The roll bar of this invention is in its retracted position in FIG. 1 note that it does not obstruct the lines of vision and looks like an ordinary loop-type or apertured headrest.

Figure 3:
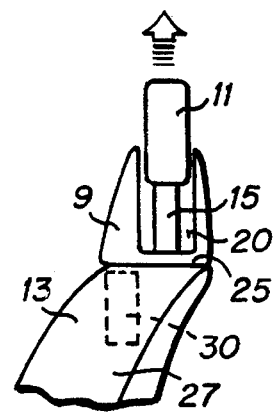
FIG. 3 is a fragmentary, right side elevation view showing an extended, working position of the roll bar.
Figure 2:
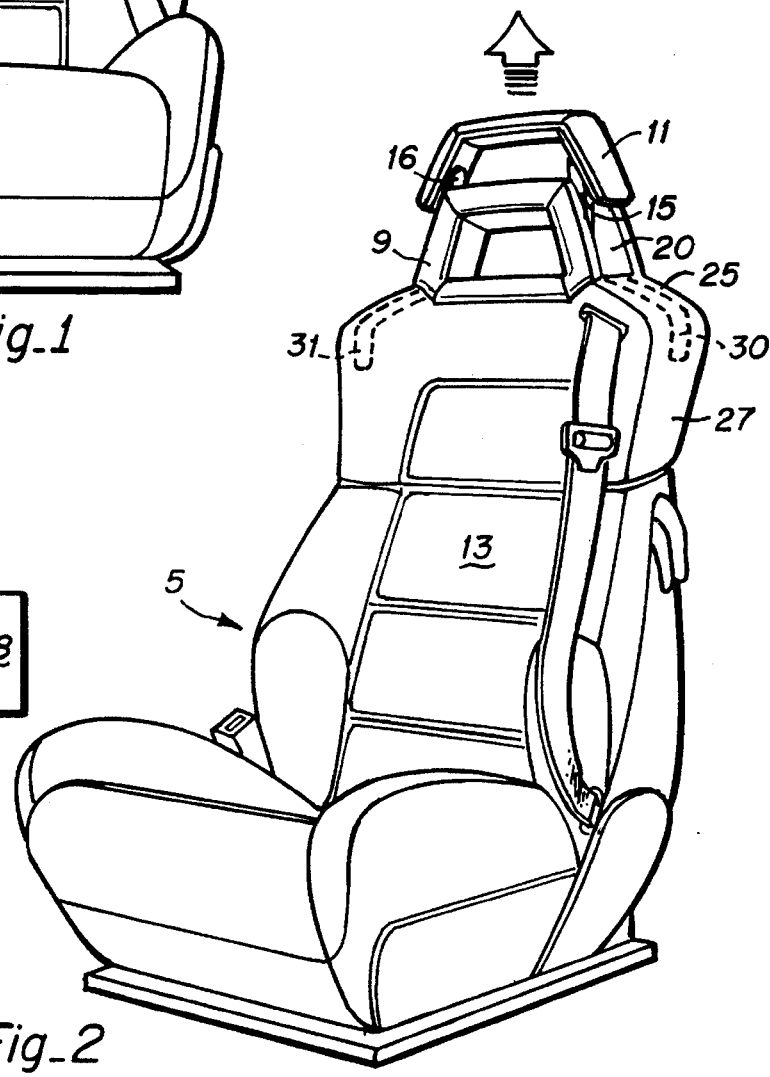
FIG. 2 is an isometric view of FIG. 1 showing the roll bar extending from the headrest to its working position.

FIGS. 2 and 3 show the roll bar 11 of this invention moving outward into its "working" or operating position where it is extended vertically upward from its "rest" position (where the roll bar 11 is formed as a part of the headrest 9). In the preferred embodiment, the roll bar 11 extends along a straight line, which is generally co-linear with the reinforced backrest 13 of seat 5. The roll bar 11 includes a pair of legs 15,16 which cooperate with the appropriately reinforced backrest 13 of seat 5, and includes a self locking mechanism (see FIG. 4) so that, in the fully extended working position, the roll bar 11 and backrest combine to form a single rigid member. The side and top perimeter edges of the headrest 9 are channeled 20 to accept the underside surface of the roll bar 11 as it is retracted into the rest position so that the roll bar 11 forms the upper outer surface of the headrest 9. The headrest 9 is also provided with sufficient padding on its contact surfaces so that the seated passenger will not feel the roll bar 11 should his or her head or hand come to rest against the top or side perimeter edges thereof adjacent the roll bar 11.

Figure 4:
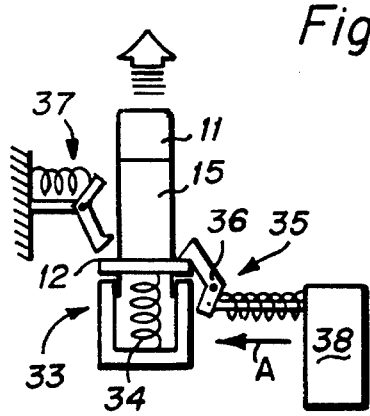
FIG. 4 is schematic representation of the spring loaded retraction system.

FIG. 4 shows, by way of example, one implementation of the retraction system as indicated generally by reference numeral 33. The retraction system 33 comprises a spring-loaded release member 35 and a hold member 37. The roll bar 11, being biased by spring member 34, is moved to the extended position as bottom portion of release member 35 is moved in the manner as shown by arrow A. This causes a pivotal rotation of the release member 35 about its pivot point 36, thus releasing its engagement with a catch 12 associated with roll bar 11 where it is then held in a locked, extended position by hold member 37. The entire retraction system 33 is contained within head and/or backrest so that it remains hidden from view.

In operation, a conventional triggering device 38 shown schematically in FIG. 4, is provided to cause the roll bar 11 to extend into the fully extended and locked, working position automatically when the proper conditions exist. The triggering device may include known means such as pendulum-type sensors used in connection with limiting motor vehicle seat belt play when a noticeable degree of body chassis lean or tilt is experienced. In addition, the proper conditions of extending the roll bar of this invention may be determined by appropriate known sensors which are able to determine a relatively slow tipping or rolling of the vehicle which, in turn, would automatically trigger the extension of roll bar 11. Since the extension of roll bar 11 must occur within a fraction of a second, a fast signalling device is desirable. Known modern day control devices and sensors are sufficient for performing this task and may be used not only in connection with roll bars but also at other areas of the vehicle where it is important to actuate a safety feature quickly in an accident situation. An example would be the use of accelerometers for sensing a collision and to trigger the inflation charge device of an inflatable air bag.

Figure 6:
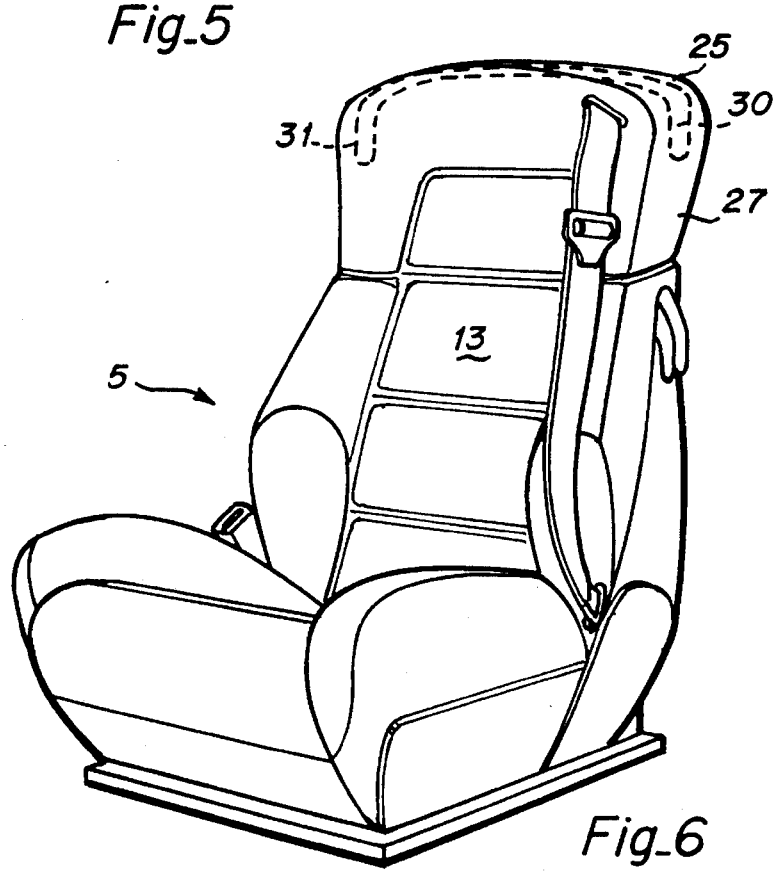
FIG. 6 is an isometric view of the seat of FIG. 1 not having a headrest and showing the retractable roll bar disposed in the upper portion of the backrest.

As is illustrated in FIG. 1, since the roll bar in its rest position is located in the headrest 9 of the seat 5, no changes to the vehicle chassis are needed to equip the vehicle with a roll bar. It should be noted that while the preferred embodiment discloses a generally U-shaped roll bar 11 having a pair of downwardly spaced legs that are disposed to lie flush within the receiving channel of the headrest 9, a similar alternate embodiment may also be provided for a seat which has no headrest. In this case, it is presently preferred to provide a generally wider inverted U-shaped roll bar 30,31 (shown in phantom in FIGS. 2 and 3) and incorporate it into the top 25,26 and upper sides 27,28 of backrest 13 of a reinforced seat in a manner similar in design to the preferred embodiment shown in FIGS. 1–3. This embodiment is more clearly shown in FIG. 6 where the reinforced seat 5 of FIGS. 1–3 is shown without the headrest 9. The U-shaped roll bar 30 and 31 is shown in phantom incorporated into the top 25 and upper sides 27 of the backrest 13.

Figure 5:
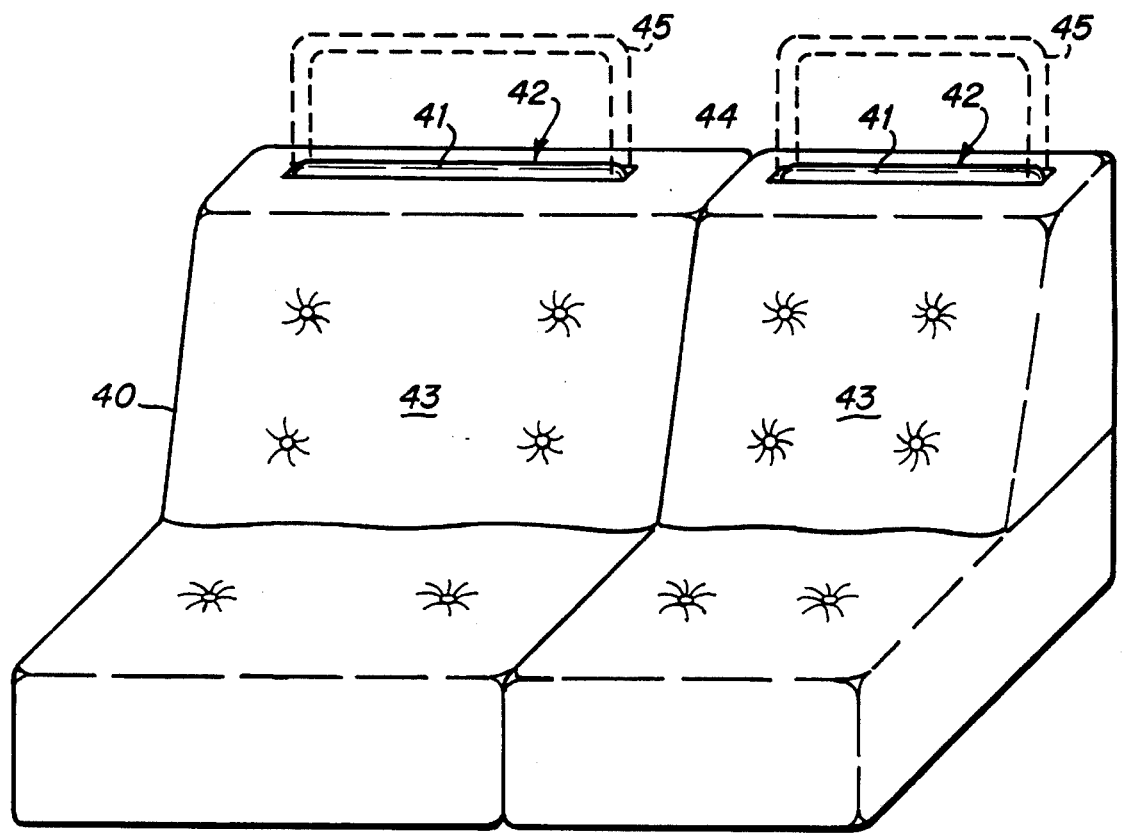
FIG. 5 is an isometric view of a bench-type seat showing the retractable roll bar in the top portion of the backrest.

FIG. 5 shows an isometric view of the roll bar 41 in its rest position disposed in the top 44 upper portion of the backrest 43 of a bench-type seat 40 (either a front or back seat) not equipped with a headrest. The top of the roll bar 42 may either be exposed or concealed. The roll bar in its extended position is shown in phantom 45.

From a production standpoint, the roll bar of this invention is easily implemented in existing vehicle assembly lines since there is no need to differentiate between vehicles which are to be equipped with a roll bar, such as convertibles, and vehicles which do not require a roll bar, such as sedans, as the same seat can be used for both types of motor vehicles. This permits a low-cost implementation of the invention. Furthermore, no additional construction space is required to implement the roll bar of this invention since the roll bar in its rest position is fully confined within the headrest or backrest of the seat. Indeed, there is actually a reduction of weight and construction space accomplished by implementation of this type of convertible roll bar assembly, thereby permitting use of the rear hat shelf region of the convertible for other purposes. It should also be noted that unlike prior art pivot-type roll bar devices, driver visibility is not impaired when the roll bar of the present invention is in the retracted (rest) position. Another advantage with the roll bar of this invention is that in addition to the combination with traditional bucket seats as shown if FIGS. 1–4, and 6 it may also be used in combination with reinforced front bench seats or rear passenger seats as shown in FIG. 5 and still achieve the objects of improved safety and conservation of valuable interior passenger compartment space.

It should be understood that various modifications within the scope of this invention can be made by one of ordinary skill in the art without departing from the spirit thereof. For example, a passenger actuated release may be employed so that the roll bar may be extended manually before any need or dangerous condition (tip-over or roll-over) arises. I therefore wish my invention to be defined by the scope of the appended claims in view of the specification as broadly as the prior art will permit.

I claim:

1. In a motor vehicle seat assembly having a slat and a reinforced backrest capable of supporting at least a portion of the weight of a vehicle in a rollover or a tip-over position, the improvement comprising in operative combination:

a) an upper portion of said reinforced backrest;
b) a retractable roll bar assembly disposed receivingly in association with said upper backrest portion; and
c) said retractable roll bar assembly including a roll bar, mounted moveably between a first retracted position in which said roll bar is substantially flush with at least a part of said backrest upper portion, and a second extended position outward of said backrest upper portion to provide a safety support spaced upward, in the normal passenger seating position, of said seat upper portion.

2. Seat assembly as in claim 1 wherein:
a) said roll bar assembly includes means for extending said roll bar outwardly.

3. An improved motor vehicle seat assembly as in claim 2 which includes:
a) means for sensing an early stage of a tip-over or rollover of a vehicle in which said seat assembly is mounted, said sensing means is disposed in communication with said extending means to cause said extending means to extend said roll bar when said sensing means detects a roll-over or tip-over of said vehicle.

4. An improved motor vehicle seat assembly as in claim 3 wherein:
a) said extending means includes a spring for biasing said roll bar outwardly.

5. Seat assembly as in claim 4 wherein:
a) said roll bar assembly includes a retractable catch retaining said roll bar in said retracted position against the force of said spring.

6. Seat assembly as in claim 1 wherein:
a) said backrest does not include a headrest; and
b) said roll bar is disposed in the top portion of said backrest.

7. Seat assembly as in claim 6 wherein:
a) said seat is a back seat.

8. Seat assembly as in claim 6 wherein:
a) said seat is a bench-type seat.

9. Seat assembly as in claim 1 wherein:
a) said backrest include a headrest; and
b) said roll bar is disposed in said headrest.

10. Seat assembly as in claim 9 wherein:

a) said headrest is a loop-type headrest, and
b) said roll bar is an inverted U-shape recessed into the top and at least parts of the sides of said loop.

11. An improved motor vehicle seat assembly as in claim 10 wherein:
a) said roll bar assembly includes an extending means for extending said roll bar outwardly.

12. An improved motor vehicle seat assembly as in claim 11 which includes:
a) means for sensing an early stage of a tip-over or rollover of said vehicle in which said seat is mounted, said sensing means is disposed in communication with said extending means to cause said extending means to extend said roll bar when said sensing means detects a roll-over or tip-over of said vehicle.

13. Seat assembly as in claim 12 wherein:
a) said sensor means includes a pendulum-type angle sensor.

14. In a method of protecting vehicle occupants against crush injury from tip-over or rollover accidents including providing a roll bar for carrying at least a part of a vehicle weight, the improvement which comprises the steps of:
a) providing a retractable roll bar in association with the upper portion of a seat backrest of a vehicle seat, said vehicle seat being reinforced to support at least part of the weight of a vehicle in a roll-over or tip-over position;
b) said roll bar being linearly upwardly extendible from a first concealed stowed position in the upper portion of said seat backrest to an upwardly extended position; and
c) providing means for releasing said roll bar in an early stage of a tip-over or rollover of a vehicle in which said vehicle seat is mounted.

15. Roll bar protection method as in claim 14 which includes the step of:
a) providing means for sensing an early stage of a tip-over or rollover of said vehicle.

16. Roll bar protection method as in claim 15 wherein:
a) said roll bar is provided in a headrest portion of said seat.

17. Roll bar protection method as in claim 16 wherein:
a) said headrest is a loop-type headrest.

* * * * *